United States Patent [19]
Chuang

[11] Patent Number: 5,333,478
[45] Date of Patent: Aug. 2, 1994

[54] STEERING WHEEL SECURITY DEVICE

[76] Inventor: Keh-Shih K. Chuang, P.O. Box 2-53, Hsinchu, Taiwan, 30043

[21] Appl. No.: 90,505

[22] Filed: Jul. 13, 1993

[51] Int. Cl.⁵ ............................................. B60R 25/02
[52] U.S. Cl. ..................................... 70/209; 70/226; 70/237
[58] Field of Search ..................................... 70/14–19, 70/198–206, 209–212, 225, 226, 237, 238

[56] References Cited

U.S. PATENT DOCUMENTS

| | | | |
|---|---|---|---|
| 3,742,743 | 7/1973 | Stoyanovitch | 70/209 |
| 4,823,573 | 4/1989 | Latta | 70/209 |
| 4,935,047 | 6/1990 | Wu | 70/209 |
| 4,949,561 | 8/1990 | Solow et al. | 70/209 |
| 5,005,388 | 4/1991 | Lo | 70/209 |
| 5,007,259 | 4/1991 | Mellard | 70/209 |
| 5,031,428 | 7/1991 | Jan et al. | 70/209 |
| 5,107,692 | 4/1992 | Chen | 70/209 |
| 5,157,951 | 10/1992 | Chen et al. | 70/226 X |
| 5,199,283 | 4/1993 | Chen | 70/209 |
| 5,199,284 | 4/1993 | Lin | 70/226 X |

FOREIGN PATENT DOCUMENTS 3030308 4/1982 Fed. Rep. of Germany ........ 70/226

Primary Examiner—Peter M. Cuomo
Assistant Examiner—Suzanne L. Dino
Attorney, Agent, or Firm—Timothy T. Tyson

[57] ABSTRACT

A vehicle security device (20) is disclosed to inhibit movement of a steering wheel (30) by abutment with the vehicle interior. The device includes angular, radial and axial adjustments between a pair of members (22, 24) to optimize interference with the vehicle interior and to facilitate installation and removal.

11 Claims, 5 Drawing Sheets

STEERING WHEEL SECURITY DEVICE

FIELD OF THE INVENTION

The present invention relates generally to vehicle security devices and more particularly to devices directed to restriction of steering wheel movement.

BACKGROUND OF THE INVENTION

Numerous examples exist in the art of vehicle steering wheel security devices. U.S. Pat. Nos. directed to such devices include 4,103,524; 4,304,110; 4,935,047; 5,092,146; 5,142,889; 5,165,264; 5,174,138; 5,197,308 and 5,199,284.

SUMMARY OF THE INVENTION

The present invention is directed to a vehicle steering wheel security device characterized by a pair of elongate members having angular, radial and axial adjustments therebetween to optimize interference with a vehicle interior and facilitate installation and removal from a steering wheel.

In a preferred embodiment, one of the members defines transverse bosses directed to the other of the members to abut the steering wheel rim or spokes when removal of the device from the steering wheel is attempted.

In a preferred embodiment, a spinner is rotatably carried by one of the members about a transverse axis and the spinner defines a passage to radially slidably carry the other of the members. A plurality of circumferentially spaced indentations are defined by the spinner and a plurality of longitudinally spaced depressions are defined by the other member. Spring urged detents are respectively received in a selected one of the indentations and a selected one of the depressions to define a plurality of angular and radial relationships between the members.

In a preferred embodiment, the spinner is axially slidably carried by one of the members and spring urged toward the member to where the members have a proximate axially spaced relationship closely engaging the steering wheel rim. The axial spacing between the members may be increased against the urging of the spring to facilitate installation and removal of the device.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
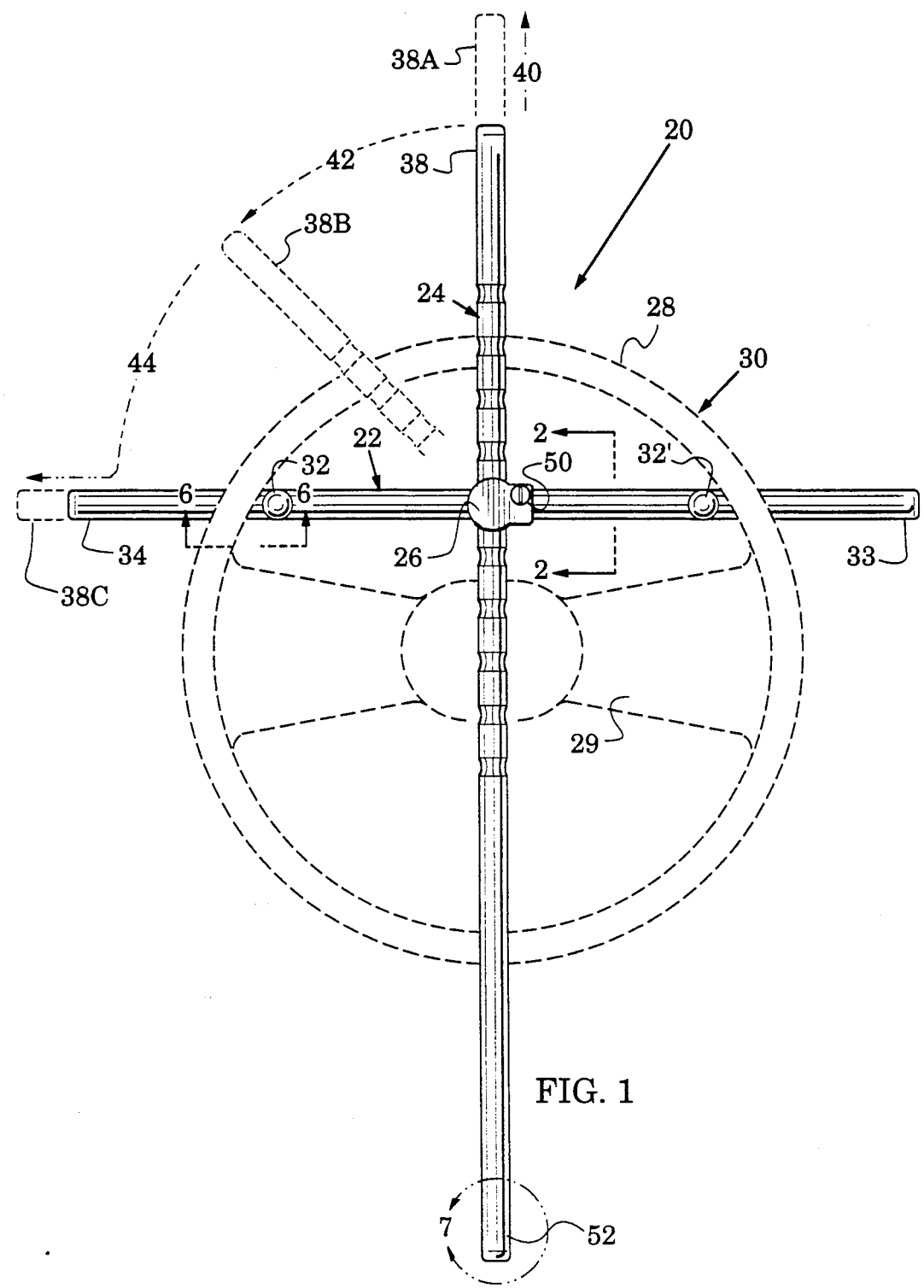
FIG. 1 is a front view of a preferred embodiment, in accordance with the present invention, of a vehicle security device installed on a steering wheel.

FIG. 1 illustrates a steering wheel security device 20, a preferred embodiment in accordance with the present invention, installed on a vehicle steering wheel 30. The embodiment 20 has first and second elongate members 22, 24 which are rotatable relative to each other along a transverse axis through a spinner 26 and which are spaced along this axis to enclose the steering wheel rim 28 therebetween. A pair of bosses 32 extend transversely from the member 22 to abut the steering wheel rim 28 or spokes 29 if an attempt is made to move the embodiment 20 relative to the steering wheel 30.

As will be further disclosed in the more detailed description below, the members 22, 24 are axially urged together by a spring, carried by the spinner 26, to a proximate axial spacing which is dimensioned to closely engage the steering wheel rim 28. However, when the members are in an unlocked condition, the axial spacing between the members 22, 24 may be increased, against the urging of this spring, to facilitate installation of the device 20 on the steering wheel 30.

Two methods of installing the security device 20 will now be described. Each method results in the security device 20 having the position shown in solid lines in FIG. 1 on the steering wheel 30 which is shown in broken lines in the same figure.

In a first installation method, the members 22, 24 and spinner 26 are first assembled substantially as shown in solid lines in FIG. 1. This assembly is then moved to the right in FIG. I with the end 33 of the member 22 passing under the rim 28 until the spinner 26 abuts the rim 28. The left end 34 of the member 22 is next rotated backwards until the member 24 abuts the outer surface of the rim 28. Moving the left end 34 still farther back, over the urging of the spinner spring, allows the end 34 to be depressed behind the rim 28. The assembly is then moved leftward to the final position shown in solid lines in FIG. 1. To facilitate this final leftward movement, the right-hand boss 32' is caused to move beneath the rim 28 by pressing the right end 33 backwards against the urging of the spinner spring.

In a second installation method, the member 24 is first pulled radially out of the spinner 26 leaving an assembly of the member 22 and the spinner 26. This assembly is placed behind the rim 28 to the position shown in solid lines in FIG. 1. The member 24 is then moved over the outer side of the rim 28 and reinserted into the spinner 26. The member 24 is then inserted farther through the spinner 26 and over the diametrically opposite side of the rim 28 to the position shown in solid lines in FIG. 1. To facilitate this final radial (relative to the steering wheel 30) movement of the member 24, the lower end 52 is pulled upward against the urging of the spinner spring to allow it to pass over the rim 28.

Once installed on the steering wheel 30, the member 24 can be slid radially through the spinner 26 so that, for example, its upper end 38 is moved upward to another position 38A as indicated by the radial arrow 40. In addition, the spinner 26 is rotatably mounted on the member 22 so that, for example, the end 38 can be moved to an angular position 38B as indicated by the arrow 42. As another example, the member 24 can be rotated and radially moved, as indicated by the arrow 44, to place the end 38 in position 38C. With the end 38 in position 38C, the member 24 is substantially parallel with member 22 (for clarity of illustration, only the end 38 of member 24 is shown in positions 38A, 38B and 38C).

When the device 20 is installed as in FIG. 1, a key operated lock 50 locks the angular, radial and axially spaced relationships between the members 22, 24. In any locked relationship, the device 20 closely engages the steering wheel 30 and an attempt to rotate the steering wheel 30 causes a protruding end, e.g., the lower end 52 of the member 24, to abut a portion of the vehicle interior, e.g., door, passenger seat, roof. Rotary movement between the steering wheel 30 and the device 20 is restricted by abutment of the bosses 32 with the rim 28 and spokes 29.

Therefore, in accordance with a feature of the invention, the variable angular and radial relationships between the members 22, 24 permit interference between the device 20 and the vehicle interior to be optimized. For example, the member 24 could be rotated and then radially moved to position its lower end 52 between the vehicle door and passenger seat prior to locking the lock 50. In accordance with another feature of the invention, the variable axial spacing between the members 22, 24 facilitates installation and removal of the device 20.

Figure 2:
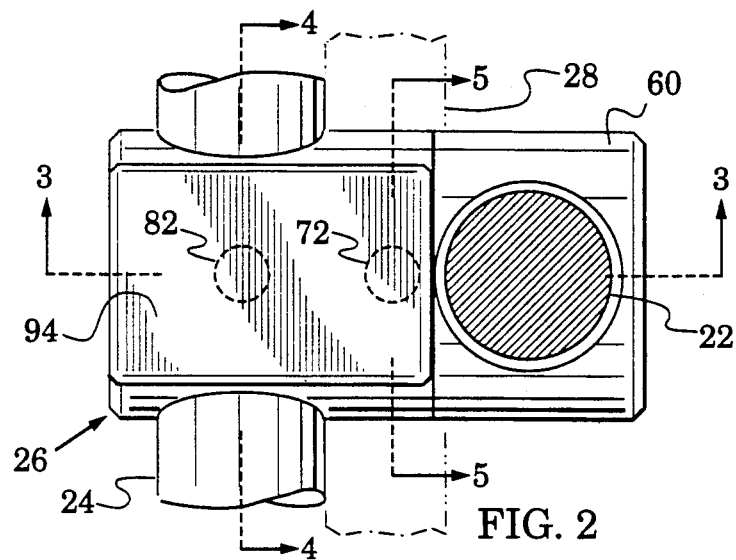
FIG. 2 is a view along the plane 2—2 of FIG. 1.
Figure 3A:
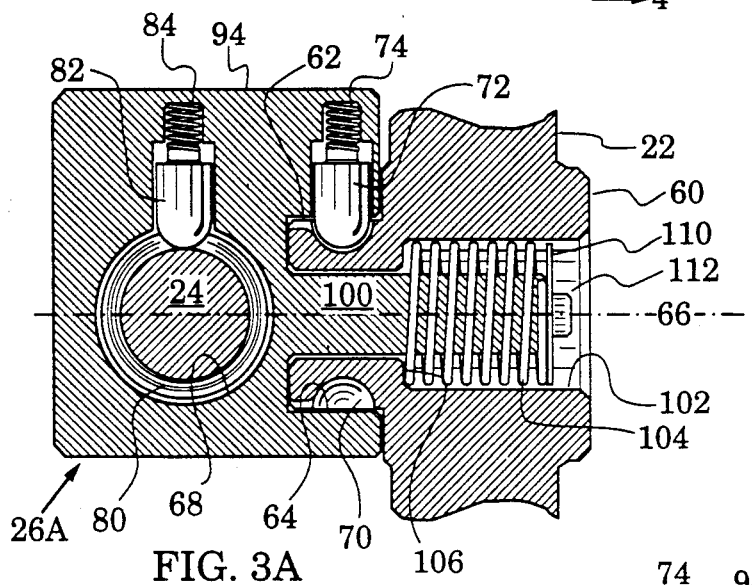
FIG. 3A is a view along the plane 3—3 of FIG. 2 illustrating a first axial relationship.
Figure 3B:
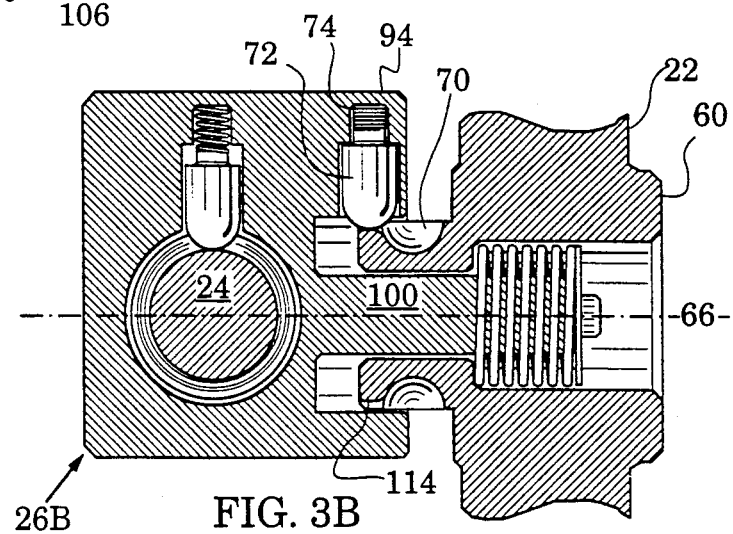
FIG. 3B is a view along the plane 3—3 of FIG. 2 illustrating a second axial relationship.
Figure 4:
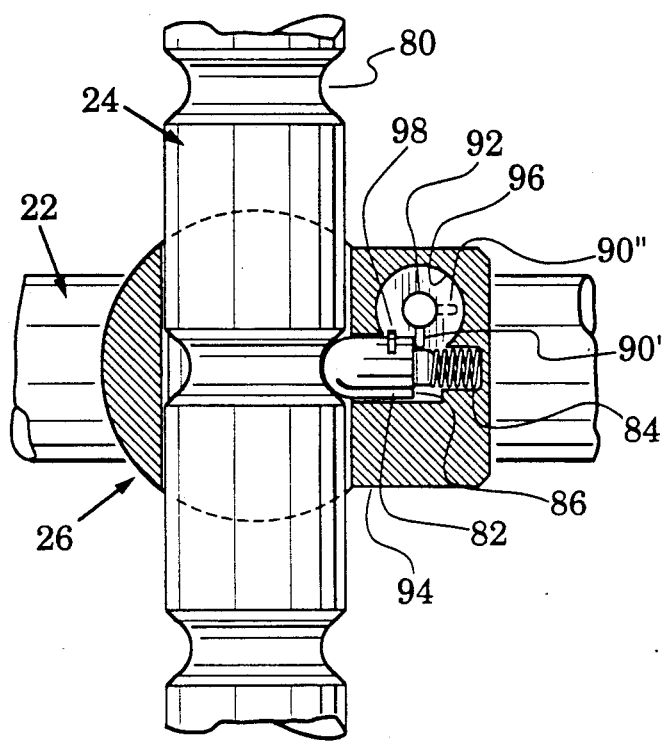
FIG. 4 is a view along the plane 4—4 of FIG. 2.
Figure 5:
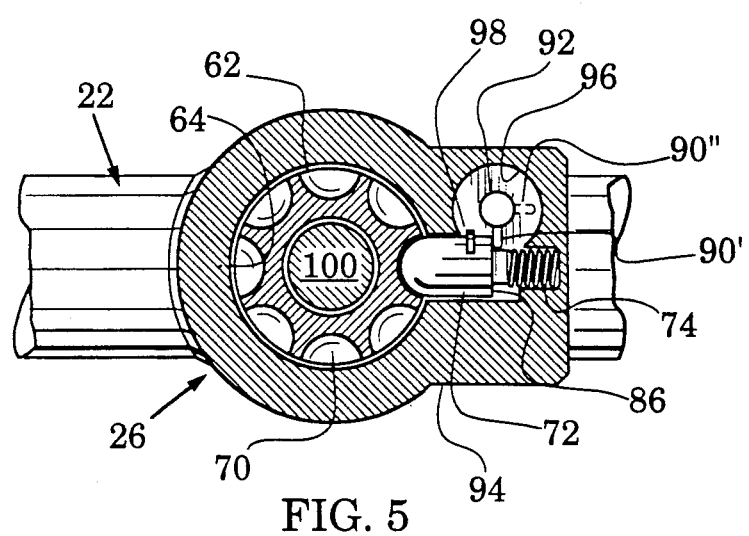
FIG. 5 is a view along the plane 5—5 of FIG. 2.

Detailed attention is now directed to FIGS. 2, 3, 4 and 5. FIG. 2 is a view along the plane 2—2 of FIG. 1 while FIGS. 3, 4 and 5 are views respectively along the planes 3—3, 4—4 and 5—5 of FIG. 2. In these views, the member 22 is shown to define a hub 60 which is configured with an external diameter similar to that of the spinner 26.

The hub 60 defines a journal 62 which is rotatably received within a bearing 64 defined by the spinner 26. The journal 62 and bearing 64 allow the members 22, 24 to rotate relative to each other about an axis 66 arranged transversely to the member 22. The spinner 26 defines a passage 68 which slidably receives the member 24. The passage is oriented transversely to the axis 66 so that the member 24 rotates in a plane substantially parallel to the member 22.

The journal 62 defines a plurality of circumferentially spaced indentations 70 which can each receive a detent 72 slidingly disposed within the spinner 26 and urged toward the journal 62 by a spring 74. The member 24 defines a plurality of longitudinally spaced depressions 80 which can each receive a detent 82 slidingly disposed within the spinner 26 and urged towards the member 24 by a spring 84.

As seen in FIGS. 4, 5, the detents 72, 82 each have a step 86 which can be abutted by a pawl 90 carried on the cylinder 92 of the lock (50 in FIG. 1). The spinner 26 defines a rectangular extension 94 to house the detents 72, 82 and the lock cylinder 92. A bore 96 in the extension 94 allows free rotation of the pawl 90 between a locked position 90' and an unlocked position 90". Each detent 72, 82 defines a ridge 98 which can abut the bore 96 to retain the detent within the spinner 26.

FIGS. 3A, 3B illustrate a cylindrical tongue 100 defined by the spinner 26 to extend into a chamber 102 of the hub 60. A coil spring 104 is captured between an end wall 106 of the chamber 102 and a washer 110 which is fixed to the end of the tongue 100 by a bolt 112. In the absence of external forces, the spring 104 urges the spinner 26 to position 26A where it has a proximate axially spaced relationship with the hub 60. This proximate axially spaced relationship can be locked by turning the pawl 90 to its locked position 90' where it abuts the detent step 86 to retain the detent 72 in one of the circumferential indentations 70 as shown in FIG. 5.

When the pawl 90 is in its unlocked position 90", the spinner can to position 26B by forcing the detent 72 back against the urging of spring 74 as shown in FIG. 3B. The position 26B of the spinner forms an open axially spaced relationship with the hub 26 in which the security device 20 can be installed and removed from the steering wheel 30. A relief 114 axially extends from each of the indentations 70 to facilitate lifting of the detent 72 if it is approaching the journal 62 rather than moving away from it.

When the pawl 90 is in its unlocked position 90", the member 24 can slide radially within the spinner 26 by forcing the detent 82 back against the urging of the spring 84 until the detent 82 can engage an adjacent depression 80.

Therefore, FIGS. 2-5 illustrate that the detent 72 can engage each of the circumferentially spaced indentations 70 to define one of a plurality of angular relationships between the members 22, 24; the detent 82 can engage each of the longitudinally spaced depressions 80 to define one of a plurality of radial relationships between the members 22, 24; and the spinner 26 can be moved axially, against the urging of spring 104, from a proximate axially spaced relationship with the hub 26 where the detent 72 engages one of the indentations 70 to an open axially spaced relationship which enhances installation and removal of the security device 20.

Figure 6A:
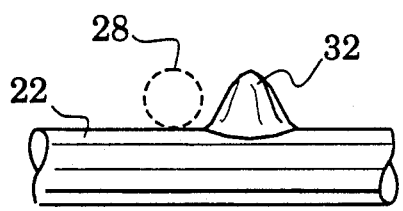
FIG. 6A is a view along the plane 6—6 of FIG. 1 showing a preferred boss embodiment.
Figure 6B:
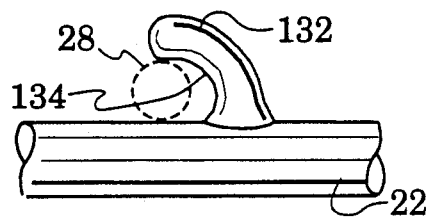
FIG. 6B is a view along the plane 6—6 of FIG. 1 showing another preferred boss embodiment.

FIG. 6A is a view along the plane 6—6 of FIG. 1 showing the boss 32 extending transversely from the member 22 from where it can engage the adjacent steering wheel rim 28 if the security device 20 is moved relative to the steering wheel 30. FIG. 6B is a similar view showing another preferred boss embodiment 132 which extends further from the member 22 to define an arcuate surface 134 configured to partially envelope the rim 28 and thus enhance retention of the device 20.

Figure 7A:
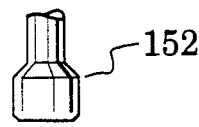
FIG. 7A illustrates a preferred embodiment of the structure within the circle 7 of FIG. 1.
Figure 7B:
FIG. 7B is an end view of the structure of FIG. 7A.

FIG. 7A is a view of the structure within the circle 7 of FIG. 1, illustrating another preferred end 152 of the member 24 while FIG. 7B is an end view of this structure. FIGS. 7A, 7B show the end 152 defining a socket 154 configured to receive a vehicle road wheel lug nut. Thus, the security device 20 could also be used to remove and install road tires. Obviously this end structure could be on either member 22, 24.

In the first installation method described above, the length of the member 22 from the spinner 26 to one of the ends 33, 34 must be limited in order to install it on the steering wheel 30 as shown in FIG. 1. For example, the spacing from the spinner 26 to the end 34 must not exceed the inner diameter of the steering wheel rim 28 so that the end 34 can be depressed behind the rim 28. The spacing to the other end 33 and the length of the member 24 are limited only by the vehicle interior dimensions. In the second installation method described above, this restraint on the length of the member 22 is removed.

Figures 8A, 8B:
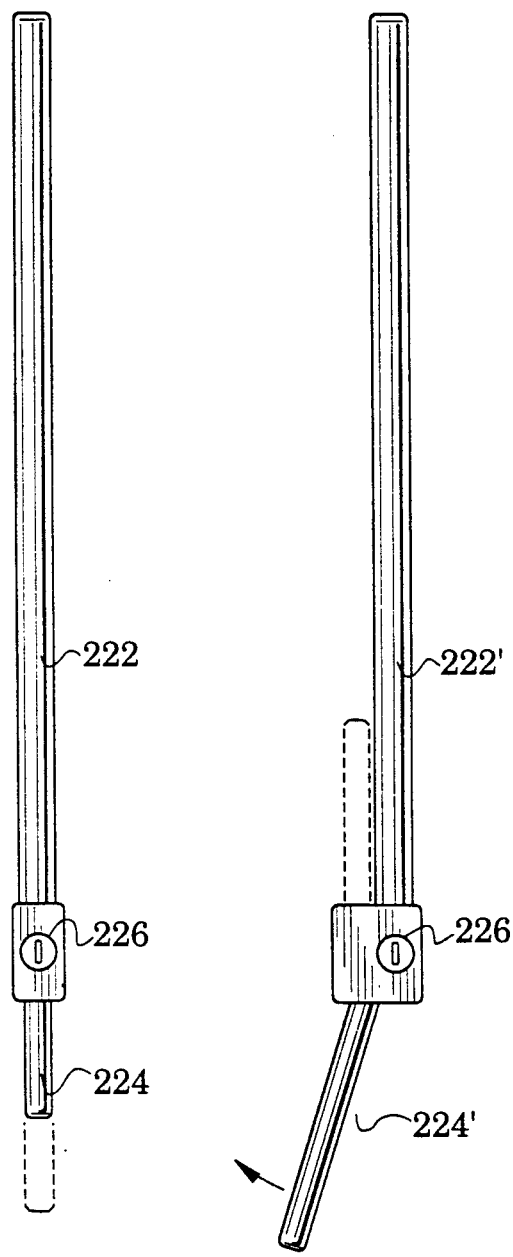
FIG. 8A is another preferred embodiment of one of the elongate members of FIG. 1.
FIG. 8B is another preferred embodiment of one of the elongate members of FIG. 1.

To make the security device 20 more easily stored when not in use, each of the members 22, 24 may have an end extension as illustrated in FIGS. 8A, 8B, that can be slid or folded to create a smaller outer envelope. In FIG. 8A a member 222 is shown to have a smaller diameter extension 224 that telescopes out of the member 222. FIG. 8B shows a member 222' that has an end 224' that is rotatable back to a stored position. Each extension can be locked in various positions with a lock 226.

Figure 9:
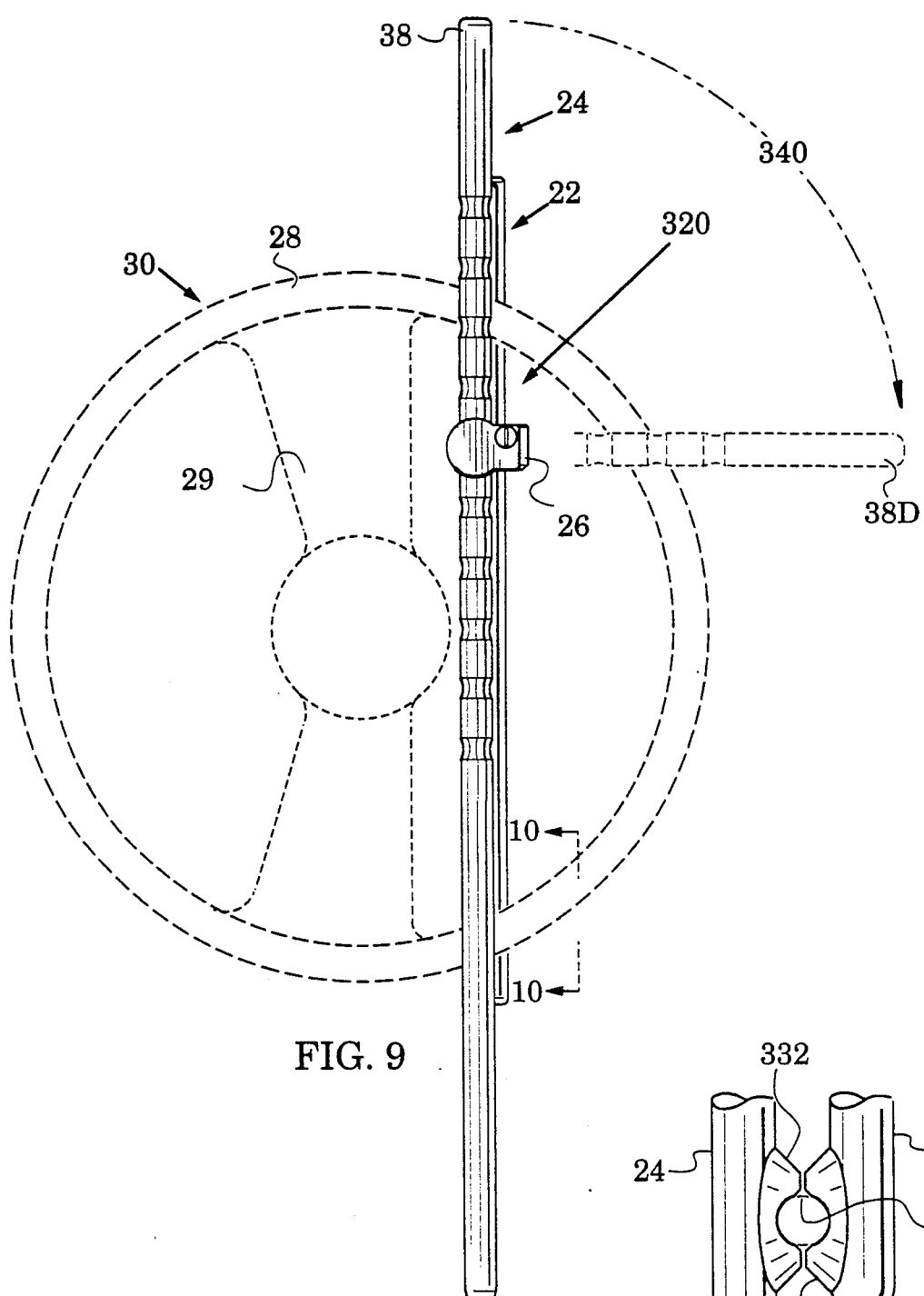
FIG. 9 is a front view of another preferred vehicle security device embodiment installed on a steering wheel.
Figure 10:
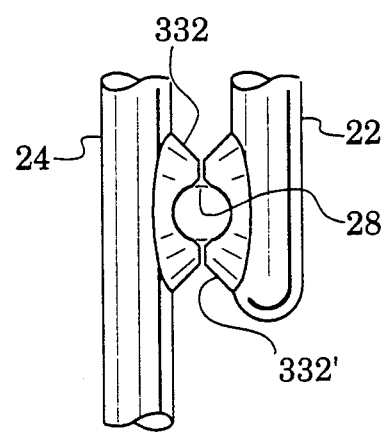
FIG. 10 is a view along the plane 10—10 of FIG. 9.

FIG. 9 is a front view of another preferred security device embodiment 320 installed on a steering wheel 30. Similar to the embodiment 20, the embodiment 320 has a pair of members 22, 24 rotatably mounted together with the aid of a spinner 26 (the device 320 is slightly rotated to the left to show the member 22 lying beneath the member 24). However, as shown in FIG. 10 which is a view along the plane 10—10 of FIG. 9, the embodiment 320 has bosses 332, 332' respectively located on members 22, 24 and longitudinally spaced from the spinner 26. To insure that the device 320 can not be removed from the steering wheel 30, the bosses 332 each define arcuate surfaces 334 to partially enclose the wheel rim 28. This prevents movement of a member relative to the wheel rim 28.

The angular, radial and axial adjustment features of the embodiment 320 are repeated in the embodiment 20. For example, the upper end 38 of the member 24 can be rotated to the position 38D as shown by the arrow 340 of FIG. 9 but, in this position, an appropriate radial adjustment would have to be made to again position the boss 332 over the rim 28.

From the foregoing it should now be recognized that embodiments of a vehicle security device have been disclosed herein having angular, radial and axial adjustments to optimize interference with a vehicle interior and to facilitate installation and removal from a vehicle steering wheel.

An apparatus in accordance with the present invention preferably has cylindrical members fabricated from hardened steel or other material which is resistant to cutting and other physical alteration that might be directed against the device in an attempt to remove it from the vehicle steering wheel. The longitudinally spaced depressions in one of the members are preferably annular in shape.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A security device for attachment to a vehicle steering wheel, comprising:
   a first elongate member;
   a spinner carried by said first member to rotate about an axis arranged transversely with said first member;
   a second elongate member carried by said spinner, said second member arranged transversely with said axis and axially spaced from said first member to receive the rim of said steering wheel between said first and second members with said spinner within said rim, said first and second members thus having an adjustable angular relationship;
   a first boss defined by one of said members, directed transversely towards the other of said members and longitudinally spaced from said axis;
   a first spring urged detent disposed between said spinner and said first member;
   a plurality of circumferentially spaced indentations defined in one of said spinner and said first member to each receive said first spring urged detent to define one of a plurality of angular relationships between said first and second members; and
   a lock having a pawl to abut and prevent movement of said first detent from any selected one of said indentations.

2. The security device of claim 1 wherein said second member is radially slidably received in said spinner to provide said first and second members with an adjustable radial relationship and wherein said second member defines a plurality of longitudinally spaced depressions;
   and further comprising
   a second spring loaded detent disposed between said spinner and said second member to engage each of said depressions to define one of a plurality of radial relationships between said first and second members; and wherein
   said pawl is arranged to abut and prevent movement of said second detent from any selected one of said depressions.

3. The security device of claim 1 wherein said spinner is axially slidably carried by said first member to provide said first and second members with an adjustable axially spaced relationship; and further comprising
   a spring disposed between said spinner and said first member to urge them together to a proximate axially spaced relationship wherein said first spring urged detent is received in any one of said indentations.

4. The security device of claim 3 wherein said second member is radially slidably received in said spinner to provide said first and second members with an adjustable radial relationship and wherein said second member defines a plurality of longitudinally spaced depressions;
   and further comprising
   a second spring loaded detent disposed between said spinner and said second member to engage each of said depressions to define one of a plurality of radial relationships between said first and second members; and wherein
   said pawl is arranged to abut and prevent movement of said second detent from any selected one of said depressions.

5. The security device of claim 1 further comprising a second boss defined by the member which defines said first boss, said second boss directed transversely towards the other of said members and longitudinally spaced from said axis with said axis between said first and second bosses.

6. The security device of claim 1 wherein said boss defines an arcuate shape to enhance engagement of said wheel rim.

7. The security device of claim 3 wherein said spring comprises a coil spring.

8. The security device of claim 1 wherein one of said members defines a socket configured to receive a vehicle road wheel lug nut.

9. A method of securing a vehicle steering wheel, comprising the steps of:
   providing a first elongate member;
   rotatably carrying a spinner with said first member to rotate about an axis arranged transversely with said first member;
   carrying a second elongate member with said spinner;

arranging said second member transversely with said axis;

axially spacing said second member from said first member to receive the rim of said steering wheel between said first and second members with said spinner within said rim, said first and second members thus having an adjustable angular relationship;

defining a first boss with one of said members to be directed transversely towards the other of said members and longitudinally spaced from said axis;

urging a first detent between said spinner and said first member;

defining a plurality of circumferentially spaced indentations in one of said spinner and said first member to each receive said first detent to define one of a plurality of angular relationships between said first and second members; and abutting said first detent with a lock pawl to prevent movement of said first detent from any selected one of said indentations.

10. The method of claim 9 further comprising the steps of:

radially slidably receiving said second member in said spinner to provide said first and second members with an adjustable radial relationship;

defining a plurality of longitudinally spaced depressions in said second member;

urging a second detent between said spinner and said second member to engage each of said depressions to define one of a plurality of radial relationships between said first and second members; and abutting said second detent with a lock pawl to prevent movement of said second detent from any selected one of said depressions.

11. The method of claim 9 further comprising the steps of:

axially slidably carrying said spinner with said first member to provide said first and second members with an adjustable axially spaced relationship; and further comprising disposing a spring between said spinner and said first member to urge them together to a proximate axially spaced relationship wherein said first detent is received in any one of said indentations.

* * * * *